RELAY

Original Filed April 9, 1947 2 SHEETS—SHEET 1

INVENTOR
WILLIAM D. MACGEORGE
BY
Barr, Barden & Fox
ATTORNEYS

RELAY

Original Filed April 9, 1947 2 SHEETS—SHEET 2

INVENTOR
WILLIAM D. MACGEORGE
BY
Barr, Bordu & Fox
ATTORNEYS

Reissued Oct. 30, 1951 Re. 23,426

UNITED STATES PATENT OFFICE 23,426

RELAY

William D. Macgeorge, Collegeville, Pa., assignor to Automatic Temperature Control Co., Inc., Philadelphia, Pa., a corporation of Pennsylvania Original No. 2,554,467, dated May 22, 1951, Serial No. 740,507, April 9, 1947. Application for reissue August 9, 1951, Serial No. 241,137

5 Claims. (Cl. 175—320)

Matter enclosed in heavy brackets [ ] appears in the original patent but forms no part of this reissue specification; matter printed in italics indicates the additions made by reissue.

This invention relates to relays, and particularly to relays of "trigger" action, operative, for instance, upon the attainment of a desired condition of a conditioned device.

There are many situations in the industrial arts in which the variation[s] of a given condition is manifested by the minute movement of an associated element and in which therefore its instantaneous position is a function of the condition of the device. It is frequently desired that the attainment of a predetermined condition of such device be used as a control function, whereby some collateral or related activity is started, terminated or modulated. A typical illustration is comprised by a weighing beam, the attitude or position of which changes with the gradual addition of weight to the weighing hopper or platform, and by which it is desired to shut off or otherwise regulate the inflow to the platform or hopper of the weighing device when the desired amount of the articles has been deposited thereon from some automatically controllable supply. The weighing beam is, of course, a purely illustrative example, and any other condition than weight may be similarly controlled or used as a collateral controlling device, or any movable element responding to changes of condition of a conditioned device can be used, whether the condition be temperature, pressure, weight, humidity, fluid flow rate, liquid level indication, or otherwise, the attainment of a predetermined condition is used as the means for either signalling the fact, or controlling some element affecting the condition or for other purposes.

There may also be desired two different types of control functions, depending upon the condition to be controlled. In one case, as in the weighing beam used as an illustration, it may be desired to effect a trigger action relay actuation in one sense only, as by the start of a load circuit such as will shut off the supply through suitable motor means or the like. In the other type of conditioned device control it may be desired to actuate two different load circuits in alternation on each side of a predetermined null point, such, for instance, as two valves or the like controlling the rate of flow in a flow meter, in which one valve is caused to have one operating positioning during a predetermined minimum flow, to be controlled and stopped in its operation when the rate of flow reaches a predetermined point, followed by the controlled action of another valve when the rate of flow exceeds the predetermined given rate. More simply, the alternative load circuits to be controlled may be represented by two signal devices, one functioning when the rate is below the predetermined rate, both signals to have the same indication or lack of it when the flow attains the predetermined given rate, and the other signal to function when the rate exceeds the predetermined given rate.

There have been several attempts to provide a solution to the problem, but so far as known such other efforts have involved complicated and expensive installations, and in many cases have by their very presence effected a modification of the apparent condition, to the nullification of the extreme accuracy that is so frequently desired.

It is among the objects of this invention: to improve the art of relays; to obviate the disadvantages of prior art relay structures and installations; to provide a trigger-action relay system having one element positionable as a function of condition of a conditioned device while the remainder of the system is a self-contained unit; to provide a trigger-action relay having a movable portion which is of inappreciable affect so far as effecting a modification of the condition indication; to provide a relay responsive of itself to the true condition of a conditioned device; to provide a trigger-action relay susceptible to facile and accurate adjustments to vary the condition at which the trigger-action relay functions; to provide a trigger-action relay system sensitive to minute mechanical displacements of its primary element; to make a differential transformer arranged to effect a controlled output responsive to wide mechanical displacements; to provide a relay system incorporating a differential transformer, the movable armature of which is arranged to move as a function of a conditioned device, in which the differential transformer is adjustable relative to the armature to preselect the range of operation of the armature; to provide a differential transformer with an operating control system in which the functioning of the system is responsive selectively to unbalance of the transformer in one sense, to the attainment of a null point of output from the transformer, and to the attainment of unbalance of the transformer in the opposite sense; to provide a relay system for operation with a movable armature of a differential transformer having a null point between outputs of opposite senses as functions of position of the armature, in which the range of movement of the armature during the null point is predeterminedly variable; and to provide other objects and advantages as will become more apparent as the description proceeds.

In the accompanying drawings forming part of this description:

Figure 1:
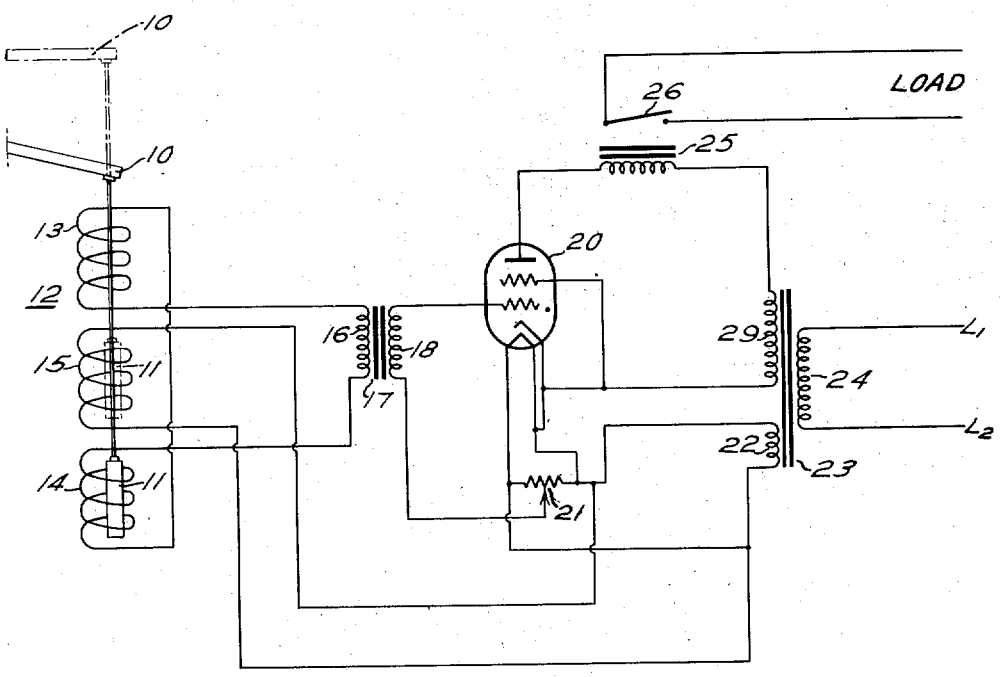
Fig. 1 represents a diagram of one illustrative circuit of the relay of this invention operatively associated with a movable element which changes position or attitude in accordance with the change in condition of a conditioned device, and in which the relay disclosed responds to changes in position of the armature as small as .0002 inch.

Referring to the form of the device shown in Fig. 1, a movable element, such as a lever arm 10 is provided, which, illustratively, moves substantially vertically, as a function of change of the condition of a conditioned device, and for purposes of illustration will be deemed a weighing beam or arm, which, with no load on the beam, is at a low point, and with increase of load on the platform or hopper thereof moves upwardly. It is desired to actuate the relay at a predetermined point in this travel corresponding to the disposition of a predetermined weight on the scale. Tied to or actuated by the end of the arm is a movable armature or magnetic core 11, which is displaced vertically, preferably by rising from a low starting position, as the load is applied to the weighing device. The armature 11 is guided to move vertically through and relative to a differential transformer 12, of the relay circuit to be described and is substantially separated from the stator coils to [perclude] *preclude* the possibility of any friction drag. The transformer 12 comprises, illustratively, upper and lower oppositely wound series connected secondary coils 13 and 14, energized by the aligned median primary coil 15 disposed symmetrically between coils 13 and 14. The secondary coils are coupled in opposition and have outputs of opposite phase so as to mutually cancel each other when the armature 11 is exactly centered in the exciting coil 15, or to have a preponderating voltage and phase in one phase A or the other phase B, according to whether the asymmetrical disposition of the armature 11 is toward coil 13 or 14. The output of coils 13 and 14 passes through the primary 16 of a transformer 17. The secondary 18 of transformer 17 connects at one end to the grid of a preferably, although not necessarily, gas filled tube 20, and the other end connects to the movable arm of a potentiometer 21 in the cathode circuit. The cathode is energized by secondary turns 22 of a power transformer 23, the primary 24 of which is in the power line $L_1$—$L_2$. The secondary turns 22 of the power transformer are connected to the primary coil 15 of the differential transformer 12 as a constant exciting source therefor. The other secondary 29 of transformer 23 is in the cathode-anode circuit, and includes a controlling relay 25 which, when energized, either closes or opens the switch 26 in the load circuit 1—2, depending upon the controlling action desired.

It will be observed that adjustment of the potentiometer 21 varies the grid bias of the tube 20, and this adjustment is coordinated with the condition of the device, indicated by the position or attitude of the movable arm 10, to determine the trigger-condition at which the relay 25 is to be energized, to close (or, as the case may be, to open) the load circuit, and thus directly or indirectly to control the condition or sound or indicate a signal. It should also be observed that said bias and the differential transformer are energized from the same source and that changes in line potential change both voltages proportionately and thus minimizes the effects of line voltage changes. Illustratively, when the arm 10 comprises a weighing beam or arm, the load circuit is coupled to automatic means for shutting off or interrupting the supply of weight to the weighing arm, so that when the predetermined weight is applied to the scale, the supply is instantly terminated by the action of switch 26 controlled by relay 25. Obviously, it can equally well be used to shut off or open any desired valve, damper, electric supply, fuel or energy flow or otherwise, or to actuate a signal.

It will be understood that the coils 13 and 14 as stated are wound oppositely, the induced voltage in the respective coils will result in a null output when the armature 11 is centered in the median primary coil 15 symmetrically of the end turns 13 and 14 due to mutual cancellation. It will be understood as explained that the positioning of the armature 11 slightly asymmetrically in the primary coil 15 will induce a higher voltage of one phase in one coil of the coils 13 and 14, than the voltage and opposite phase in the other, and therefore in accordance with the direction of asymmetry there will be a preponderating voltage and phase in one coil of coils 13 and 14, with an output through the primary 16 of the transformer 17 in accordance with such preponderating voltage. With a predetermined bias on the tube, it will be seen that with proper circuit connections and with the armature 11 in the lower secondary coil 14, the initial output of the differential transformer will be a voltage of a phase such as to augment the bias of the tube at the inception of the control motion, which precludes any transmission through the tube. With upward movement of armature 11 and decrease of the value of the preponderating voltage, the grid bias augmentation progressively diminishes, until the critical range of the circuit is reached. This begins when the vertical progress of the armature 11 has caused it to reach a point of symmetry in the differential transformer, at which the output of the transformer 17 is null, and ends when with slight further upward movement of the armature there is a reversal of the preponderating voltage in the transformer 17, at which, with proper [polarity] *phase* and increasing voltage, the output of the transformer balances and then overcomes the bias on the tube, at which point the tube fires or is energized to cause flow in the anode circuit, the switch 26 of relay 25 is pulled in or out and the load circuit is instantaneously controlled.

It will be understood that the potentiometer is calibrated in terms of condition, so that the applied variable bias is set for the trigger-action of the relay at the desired point of change in condition, as illustratively manifested by the vertical positioning of the armature, following the movement of the arm 10. This potentiometer is used as a vernier setting only, all major adjustments being accomplished by mechanically altering the relative positions of the differential transformer stator and armature. This insures that relay action will occur only when the differential transformer armature is relatively close to null position, where little or no reactive force will be transmitted back to the conditioning device.

Figure 2:
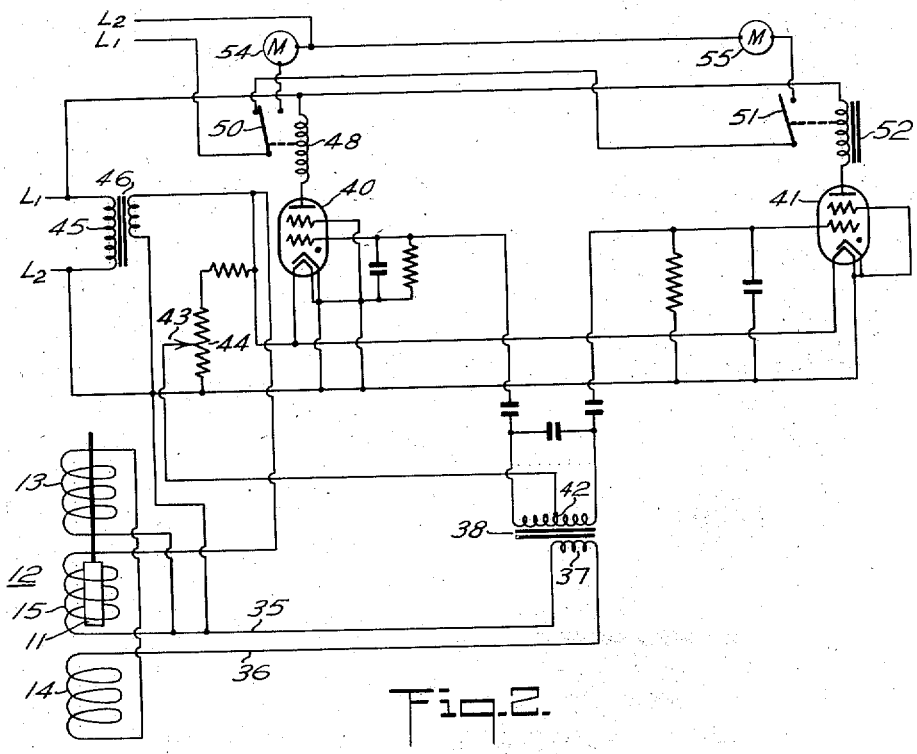
Fig. 2 represents a diagram of another illustrative circuit of the relay of this invention in which two alternative load circuits are controlled as functions of the position of the armature associated with a movable element of a conditioned device relative to a differential transformer, having a null point of variable length.
Figure 3:
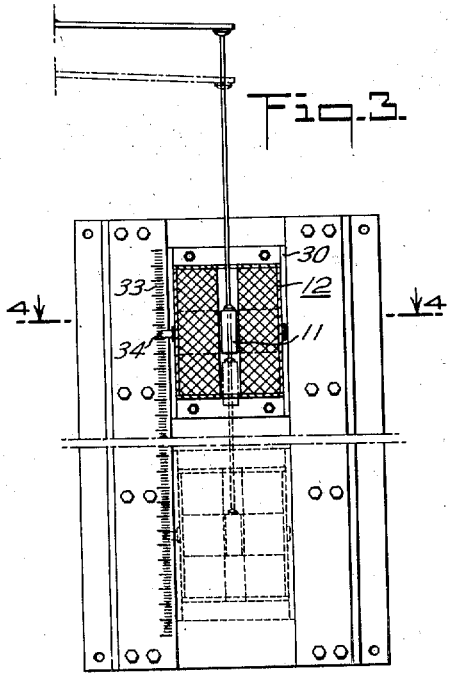
Fig. 3 represents a side elevation.
Figure 4:
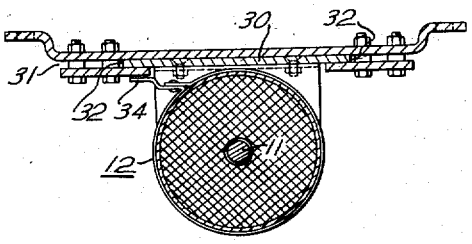
Fig. 4 represents a transverse section, of an illustrative mounting for the differential transformer relative to the movable element of the conditioned device to predetermine the range at which the critical functioning of the transformer is manifested.

For purposes of adjustably mounting the differential transformer relative to the movable armature, some such device can be used as indicated in Figs. 3 and 4. In this more or less schematic disclosure, the transformer 12 is mounted on a plate 30, of preferably non-inductive material, and is slidably guided in a fixed guide 31, having the vertical groove or recess 32 to receive and guide the plate, and one edge of the guide is suitably calibrated as at 33, for selective registration by a pointer or the like 34, carried by the transformer 12 or its supporting plate 30. It will be seen that with the guide fixed generally vertically above or below the movable element of the conditioned device, the transformer can be adjusted with ease relative to the armature 11 so as to vary the critical point of the juxtaposed armature and transformer. The form of differential transformer disclosed is preferred under certain conditions, but is illustrative of a transformer, the output of which varies between one phase of voltage output, a null point of no output, and a substantially opposite phase of voltage output according to the positioning of the armature relative to the transformer, and other forms of differential transformers having similar characteristics can be used, either with the form of relay circuit shown in Fig. 1, or that shown in Fig. 2.

Referring to the latter figure, a circuit is disclosed in which the output of the differential transformer is from leads 35 and 36, of which lead 35 is also common with one line of the primary coil 15, and which leads are joined in the primary 37 of a transformer 38. Primary coil 15 is fed by the secondary of a power transformer 46, the primary 45 of which is connected to line connections $L_1$ and $L_2$. Two tubes, respectively 40 and 41, which illustratively may comprise G. L. 502A tubes, are provided, the grids of which are coupled to the respective ends of center tapped secondary 42 of the transformer 38. The center tap connection of the secondary 42 leads to the potentiometer arm 43 of the potentiometer 44 by which the tubes are both given a negative grid bias, variable with settings of the potentiometer. The power lines $L_1$ and $L_2$, as noted, actuate the primary 45 of the transformer 46, the secondary of which furnishes approximately six volts from which the negative grid bias is applied, and these lines also furnish the tube voltages. A normally closed relay 48 is disposed in the plate circuit of the tube 40, and in the normal position of the switch 50 of this relay it completes a circuit from one side of the line $L_1$, $L_2$ to the normally open switch 51 controlled by the relay 52 in the plate circuit of the tube 41. Electrical agencies indicated broadly as motors 54 and 55 each have one side coupled to the return side of lines $L_1$, $L_2$ and their other sides coupled respectively to the abnormally closed side of switch 50 and to the closed side of normally open switch 51. It will be observed that the operation of one tube and its associated relay precludes simultaneous operation of the agency controlled by the other relay, and vice versa.

With the armature 11 asymmetrically located in the transformer 12, say, toward the secondary coil 14, of the series connected secondaries 13 and 14, there will be an output through the connectors 35 and 36 leading to the primary 37 of transformer 38, of a voltage, say, of A phase, and if the voltage is great enough to overcome the preset negative grid bias, the tube of the two tubes responding in its grid to the A phase voltage will fire and will actuate and hold in its operatively associated relay. Let it be assumed that grid of tube 40 responds to A phase voltage to overcome the bias and fire the tube, while the grid of tube 41 responds to B phase voltage for firing the tube. The electrical agency 54 will remain actuated so long as the armature is asymmetrical of the differential transformer 12 in a direction such as to produce an output of A phase. As the armature 11 moves in response to the change of condition of the conditioned device, the induced output of A phase will diminish in voltage until at some point the output will stop and be null. At about this point the bias of the tube 40 reasserts itself and the tube stops firing and the relay 48 drops out. The electrical agency 54 which the latter controls will stop, and the operator, if there is one, will know that the null point has been reached. When and if the armature resumes its travel in the same direction, the null output is rapidly changed to an output of voltage of B phase, and when this attains sufficient amplitude the voltage impressed on the grid of tube 41 overcomes the negative grid bias thereon and the tube 41 fires, pulling relay 52 in and closing the circuit through the electrical agency 55. It will be seen that adjustment of the potentiometer varies the degree of biasing of the grid of each tube, and effectively lengthens the degree of motion of the armature in the transformer at which the effective output of the differential transformer is at the null point. As both the firing voltage and the biasing voltage are from the same approximately six volt source, any fluctuations in the line voltage $L_1$, $L_2$ will be proportional and will not affect the operation of the system to any appreciable degree.

It will be understood that conversely a downward movement of the armature from the upper coil down toward the lower coil of the differential transformer is available for such trigger-action or successive alternating trigger-action controls. In such case the tube continues to have an output holding the relay 25 in (or out) in Fig. 1, or either relay of Fig. 2, until with movement of the armature the energization of the grid to pass a current is neutralized by the grid bias, at which instant the tube ceases to transmit and the previously adjusted relay drops out.

An important feature of the invention is the fact that although the curve of the ponderomotive forces of the differential transformer is only substantially linear in the area adjacent to the median point of symmetry of the armature in the primary coil, the resistance to the motion of the armature in the transformer is a minimum at this critical point, so that although at or toward the extreme ends of the maximum motion of the armature the electrical resistance to physical motion might be such as to effect such a physical drag on the armature as to upset the reading of the weight or other condition, this drag or resistance diminishes and reaches a substantial zero as the armature reaches the critical symmetrical area, so that the presence of the armature on the beam moving in the differential transformer effects no change in the reading of the effective weight on the beam, at least at the point when extreme accuracy is essential.

The compactness, simplicity, extremely low cost and trouble-free nature of the invention will be understood.

Having thus described my invention, I claim:

1. A trigger action relay circuit comprising an armature and a differential transformer, means for securing relative movement of the armature and transformer as functions of the changes of condition of a conditioned device, a relay circuit comprising a tube, means for applying a negative grid bias to the tube, means for conducting the output of the differential transformer to the grid of the tube to energize the tube when the armature is in one predetermined relation to the transformer at which the grid bias is balanced, a relay in the tube circuit, a second tube in said relay circuit, means for applying a variable negative grid bias to the said second tube, means for conducting the output of the differential transformer to the grid of the second tube to energize the second tube when the armature is in a second predetermined relation to the transformer at which the grid bias of the second tube is balanced, and a second relay in the second tube circuit.

2. A trigger action relay circuit comprising an armature and a differential transformer, means for securing relative movement of the armature and transformer as functions of the changes of condition of a conditioned device, a relay circuit comprising a tube, means for applying a negative grid bias to the tube, means for conducting the output of the differential transformer to the grid of the tube to energize the tube when the armature is in one predetermined relation to the transformer at which the grid bias is balanced, a relay in the tube circuit, a second tube in said relay circuit, means for applying a variable negative grid bias to the said second tube, means for conducting the output of the differential transformer to the grid of the second tube to energize the second tube when the armature is in a second predetermined relation to the transformer at which the grid bias of the second tube is balanced, and a second relay in the second tube circuit, said circuit arranged to maintain the grid bias on both said tubes and to prevent either tube from firing when the armature is in a third predetermined relation to the transformer between the first and the second mentioned predetermined positions, at which the output of the transformer is substantially null.

3. In combination, means movable with the change of condition of a conditioned device as a function of such change, a differential transformer, an armature movable with said means relative to said differential transformer, said transformer arranged to have an output successively of a voltage of one phase, of null voltage, and a voltage of phase substantially opposite to the first mentioned phase as the armature passes relatively to the transformer from one relative position to another, a relay circuit including two tubes, means for impressing a variable grid bias on each of the tubes, means impressing the output of the differential transformer on the respective grids of the tubes, so arranged that only one tube responds to an output of one phase while the other tube responds only to the output of said opposite phase, relays in the respective tube circuits, and two load devices operatively coupled with the respective relays to be selectively and alternately controlled in accordance with the energization of its respective tube.

4. A trigger action phase-sensitive relay circuit, comprising a power transformer, connections to the primary of said transformer for connection to a source of A. C. voltage, a signal transformer, a multi-element gas tube, a potentiometer, a relay, circuit connections joining the cathode and anode of said tube with the secondary of the power transformer and said relay, to actuate the relay when the tube fires, circuit connections coupling the grid of the tube, the secondary of the signal transformer, the movable arm of the potentiometer and the cathode of the tube, means for impressing a negative grid bias on the grid cathode circuit of the tube through said potentiometer variable with the setting of the arm thereof, and means for impressing a signal of variable amplitude on the primary of the signal transformer, which is instantaneously substantially *in phase* or oppositely out of phase with the voltage on the primary of the power transformer, whereby with a signal of predetermined amplitude and of phase opposite to that of the negative grid bias in the secondary of the signal transformer said grid bias is overcome and the tube is fired.

5. A trigger action phase-sensitive relay circuit comprising a power transformer having a plurality of secondaries and a signal transformer, connections to the primary of the power transformer for a source of A. C. voltage, a multi-element gas tube, a potentiometer having a movable arm, a phase-sensitive relay, circuit connections placing the relay and a secondary of the power transformer in the cathode-anode circuit of the tube to energize the relay when the tube fires, circuit connections to the potentiometer, the cathode of the tube, and from the arm of the potentiometer through a secondary of the signal transformer and to a secondary of said power transformer for impressing a bias on the grid of said tube variable with arm relative movement, a signal device, circuit connections from a secondary of said power transformer to the signal device for impressing a signal on the secondary of said signal transformer substantially in phase with or of the opposite phase from the phase of the said cathode-anode circuit and said negative grid bias respectively, whereby a signal impressed on the secondary of said signal transformer of amplitude of predetermined value and of phase opposite to that of the grid bias overcomes the bias and fires the tube and actuates the relay.

WILLIAM D. MACGEORGE.

REFERENCES CITED

The following references are of record in the file of this patent or the original patent:

UNITED STATES PATENTS

| Number | Name | Date |
|---|---|---|
| 1,454,005 | Wenzel | May 1, 1923 |
| 2,187,523 | Pelikan | Jan. 16, 1940 |
| 2,331,418 | Nolde | Oct. 12, 1943 |
| 2,341,968 | West | Feb. 15, 1944 |
| 2,357,745 | Kliever | Sept. 5, 1944 |
| 2,411,247 | Cohen | Nov. 19, 1946 |
| 2,412,092 | Mayle | Dec. 3, 1946 |
| 2,431,237 | Freeman | Nov. 18, 1947 |
| 2,439,711 | Bovey | Apr. 13, 1948 |
| 2,442,430 | O'Brien | June 1, 1948 |